Patented Jan. 10, 1950

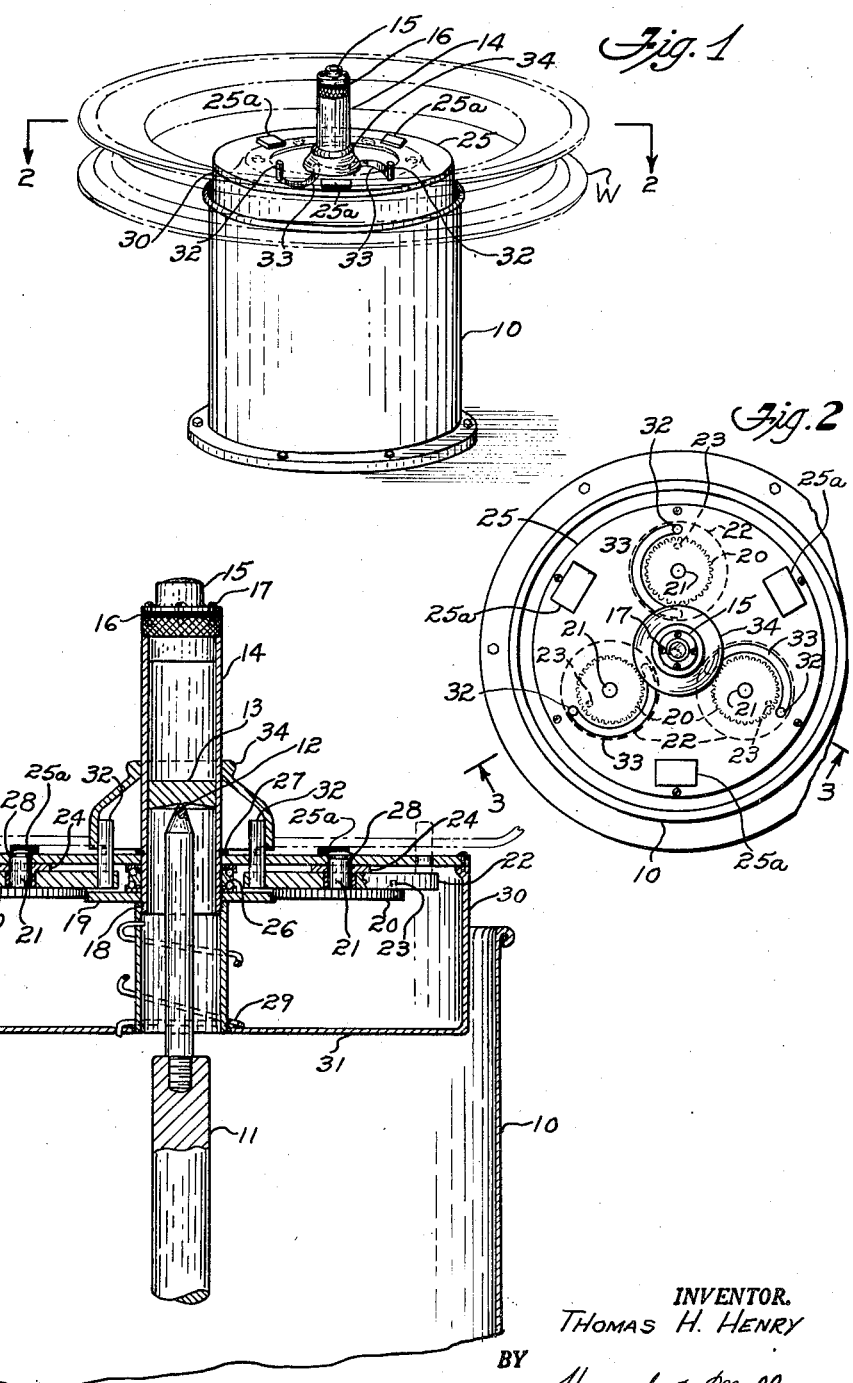

2,493,872

UNITED STATES PATENT OFFICE 2,493,872

WHEEL BALANCER

Thomas H. Henry, Los Angeles, Calif.

Application January 6, 1947, Serial No. 720,340

3 Claims. (Cl. 73—66)

This invention relates to improvements in wheel balancers such as are employed to balance automobile wheels and the like.

A primary object of the invention is to provide an improved wheel balancer wherein there is a support, a wheel-supporting means mounted thereon for universal tilting movement and adapted to support the wheel that is to be balanced, tilt indicating means thereon which will indicate the tilt of the wheel-supporting means when it is tilted by a wheel that is out of balance, and to provide a novel, simple and advantageous means for centering the wheel with relation to the wheel-supporting means.

With the foregoing and other objects in view, which will be made manifest in the following detailed description and specifically pointed out in the appended claims, reference is had to the accompanying drawings for an illustrative embodiment of the invention, wherein:

Figure 1 is a perspective view of the improved wheel balancer embodying the present invention;

Fig. 2 is a top plan view of the wheel balancer; and

Fig. 3 is a vertical section taken substantially upon the line 3—3 of Fig. 2 in the direction indicated and illustrating details of construction on an enlarged scale.

Referring to the accompanying drawings wherein similar reference characters designate similar parts throughout, the improved wheel balancer consists of an outer housing 10 within which there is a pedestal or column 11 having a pivot 12 at its upper end. The pivot employed is designed to support a wheel-supporting means for universal tilting movement and while any suitable pivot may be employed that will enable such universal tilting movement to take place I preferably employ a steel ball which is partially recessed in the top of the pedestal. This ball supportingly engages the under side of a concave plate 13 rigidly mounted within a sleeve or tubular column 14. In the top of this sleeve or tubular column there is mounted a spirit level 15 which is mounted for adjustment on a rubber or compressible disc 16 such as by screws 17. This spirit level is designed to indicate the direction and degree of tilt of the sleeve 14 on the ball 12 in the event that the wheel W is out of balance.

The lower end of the sleeve 14 is preferably shouldered, as indicated at 18, and against this shoulder there is rigidly positioned a central gear 19 of a planetary or epicyclic gear train. Around this central gear there are three spider gears 20 meshing therewith. These spider gears have stub shafts 21 extending upwardly through circular plates 22 to which they are respectively doweled or otherwise keyed such as by pins 23. The stub shafts 21 also extend through washers or anti-friction bearings indicated at 24 and through the top plate 25 of a wheel-supporting means. This top plate may be supported for rotation relatively to the sleeve 14 such as by an anti-friction bearing 26. The top plate may be retained in position against the bearing 26 such as by a split ring 27 that is partially received in a groove formed on the exterior of the sleeve 14. The upper ends of the stub shafts may be merely riveted over as at 28 to rotatably suspend them through the top plate.

On the top plate 25 of the wheel-supporting means there are preferably secured suitable pads 25a on which portions of the wheel W may rest. These pads are so arranged that when the wheel is positioned thereon its plane will be exactly at right angles to the vertical axis of the pedestal.

Attached to the top plate 25 of the wheel-supporting means is a shell 30 which provides cylindrical side walls and the bottom 31 which fits rather closely about the bottom of the sleeve 14. A torsion spring 29 has one end anchored in the sleeve and the other end anchored in the bottom 31 and serves to normally urge the shell 30 to rotate relatively to the sleeve.

On each of the plates 22 there is an upstanding dowel or pin 32 which extends upwardly through an arcuate slot 33 formed in the top plate 25. These arcuate slots are concentrically arranged with respect to the stub shafts 21. The function of these upstanding dowels is to engage the interior of the hub of the wheel and to center the wheel with relation to the plate 25. The torsion spring is so biased as to urge the shell 30, the top plate 25 and associated structure to rotate in such a direction that the spider gears 20 will be driven with relation to the central gear 19 to force the dowels or pins 32 to the extreme outer ends of their respective slots 33. As all of the dowels or pins 32 are connected together through the gear train they will be caused to move in unison and at equal rates outwardly through their respective slots. In this manner, if one side of the hub of the wheel W should be engaged by one of the dowels in advance of the engagement between the dowels and the hub on the opposite side, the engaged dowel is effective to merely slide the wheel on the pads 25a until the wheel is centered on the wheel support.

As a means for releasably retaining the dowels 32 in their innermost positions, a collar 34 is slidable on the sleeve 14 and has a downwardly extending flange which may be positioned over the dowels 32 when they are in their innermost positions. This collar is preferably somewhat conical in shape so as to facilitate the application of the wheel to the wheel support. When the wheel has been positioned on the pads the collar is caused to slide upwardly until it disengages and thus releases the dowels for expansion under the action of the torsion spring. If the wheel is extremely heavy it may be necessary to partially lift the wheel from the pads to reduce the frictional engagement therewith and thus enable the dowels to perform their centering action.

When the wheel is in applied position it is allowed to balance on the pivot or fulcrum 12 and any inequalities in the weight of the wheel are observable on the spirit level 15. Counterweights may then be applied to the wheel to balance it uniformly. These weights may be applied in any preferred or in any conventional manner to balance the wheel with respect to the pivot or fulcrum 12.

From the above-described construction it will be appreciated that an improved wheel balancer is provided wherein means is provided for centering the wheel with relation to the center of universal tilting movement and that the centering means is expansible and contractible with the parts thereof so arranged as to be caused to expand and contract in unison. The support for the wheel has a definite relationship or substantially so with respect to the fulcrum or center of universal tilting movement so that regardless of the hub diameter of the wheel that is being tested the sensitivity of the balancers will remain substantially constant.

Various changes may be made in the details of construction without departing from the spirit and scope of the invention as defined by the appended claims.

I claim:

1. A wheel balancer comprising a support, wheel-supporting means mounted for universal tilting movement upon the support, means for indicating the tilt of the wheel-supporting means on the support, said wheel-supporting means having two parts rotatable relative to each other about a vertical axis through the center of tilt, one of said parts having a central gear rigid therewith, the other of said parts having three gears rotatably mounted thereon meshing with the mentioned gear and adapted to be driven thereby on rotation taking place between said parts, means carried by the gears adapted to engage a wheel placed upon the wheel-supporting means to center it relatively to said support, and means for causing relative movement to take place between said parts.

2. A wheel balancer comprising a support, wheel supporting means mounted for universal tilting movement upon the support, means for indicating the tilt of the wheel supporting means relatively to the support, said wheel supporting means having two parts rotatable relatively to each other about a vertical axis through the center of tilt, one of said parts having a central gear rigid therewith, the other of said parts having three gears rotatably mounted thereon and meshing with the mentioned gear adapted to be driven on rotation taking place between said parts, and means carried by the last mentioned gears adapted to engage a wheel placed on the wheel supporting means to center it relatively to said support.

3. A wheel balancer comprising a support, wheel supporting means mounted for universal tilting movement upon the support, means for indicating the tilt of the wheel supporting means relatively to the support, said wheel supporting means having two parts rotatable relatively to each other about a vertical axis through the center of tilt, one of said parts having a central gear rigid therewith, the other of said parts having three gears rotatably mounted thereon and meshing with the mentioned gear adapted to be driven on rotation taking place between said parts, upstanding studs carried by the last mentioned gears and disposed equal distances from their axes of rotation, said studs being adapted to engage a wheel placed on the wheel supporting means and arranged to move outwardly in unison when the gears are driven to center the wheel relatively to said support.

THOMAS H. HENRY.

REFERENCES CITED

The following references are of record in the file of this patent:

UNITED STATES PATENTS

| Number | Name | Date |
|---|---|---|
| 2,081,402 | Krema | May 25, 1937 |
| 2,197,808 | Mason | Apr. 23, 1940 |
| 2,199,667 | Lannen | May 7, 1940 |
| 2,349,288 | Lannen | May 23, 1944 |
| 2,351,355 | Merrett | June 13, 1944 |